(12) United States Patent
Dousse

(10) Patent No.: US 10,401,187 B2
(45) Date of Patent: Sep. 3, 2019

(54) METHOD, APPARATUS AND COMPUTER PROGRAM PRODUCT FOR A NAVIGATION SYSTEM USER INTERFACE

(71) Applicant: HERE Global B.V., Eindhoven (NL)

(72) Inventor: Olivier Dousse, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/211,239

(22) Filed: Jul. 15, 2016

(65) Prior Publication Data

US 2018/0017407 A1    Jan. 18, 2018

(51) Int. Cl.
*G01C 21/00*   (2006.01)
*G01C 21/36*   (2006.01)
*G01C 21/34*   (2006.01)

(52) U.S. Cl.
CPC ..... *G01C 21/3679* (2013.01); *G01C 21/3644* (2013.01); *G01C 21/3682* (2013.01); *G01C 21/3476* (2013.01); *G01C 21/3617* (2013.01); *G01C 21/3691* (2013.01)

(58) Field of Classification Search
None
See application file for complete search history.

(56) References Cited

U.S. PATENT DOCUMENTS

| | | | | |
|---|---|---|---|---|
| 6,434,482 | B1 * | 8/2002 | Oshida | G01C 21/3679 340/995.24 |
| 6,826,472 | B1 | 11/2004 | Kamei et al. | |
| RE38,724 | E * | 4/2005 | Peterson | G01C 21/3461 340/905 |
| 7,853,403 | B2 * | 12/2010 | Tanaka | G01C 21/3453 340/988 |
| 8,010,407 | B1 * | 8/2011 | Santoro | G06Q 30/02 705/14.4 |
| 8,180,570 | B2 * | 5/2012 | Hiyokawa | G01C 21/3611 701/527 |

(Continued)

FOREIGN PATENT DOCUMENTS

| | | |
|---|---|---|
| EP | 2000775 A1 | 12/2008 |
| WO | WO 2007/067842 A1 | 6/2007 |

OTHER PUBLICATIONS

Partial European Search Report for European Application No. 17179235.1 dated Jun. 12, 2018.

(Continued)

*Primary Examiner* — Jonathan M Dager
(74) *Attorney, Agent, or Firm* — Alston & Bird LLP

(57) ABSTRACT

Embodiments described herein may provide a method for presenting a list of relevance-ranked milestone locations in a navigation system user interface. Methods may include: determining a current, map-matched location and a direction of travel; determining a plurality of milestone locations based on the current, map-matched location and the direction of travel; determining a priority ranking of the plurality of milestone locations; and providing for display of a subset of the plurality of milestone locations having the highest priority. Methods may optionally include providing for display of an estimated travel time to each of the milestone locations of the subset of the plurality of milestone locations, where the estimated travel time is based on a distance from the current, map-matched location and dynamic traffic awareness.

17 Claims, 6 Drawing Sheets

(56) References Cited

U.S. PATENT DOCUMENTS

| | | | | |
|---|---|---|---|---|
| 8,392,116 B2* | 3/2013 | Lehmann | G01C 21/3617 |
| | | | 340/991 |
| 8,412,445 B2* | 4/2013 | Uyeki | G08G 1/096827 |
| | | | 701/117 |
| 8,428,869 B2* | 4/2013 | Gill | G01C 21/3611 |
| | | | 701/410 |
| 8,606,516 B2* | 12/2013 | Vertelney | G01C 21/3617 |
| | | | 701/439 |
| 8,751,156 B2* | 6/2014 | Musabji | G01C 21/3638 |
| | | | 701/428 |
| 8,768,616 B2* | 7/2014 | Kristinsson | G01C 21/3617 |
| | | | 701/424 |
| 8,892,350 B2* | 11/2014 | Weir | G09B 29/00 |
| | | | 701/400 |
| 8,918,284 B2* | 12/2014 | Tokashiki | G01C 21/3484 |
| | | | 345/619 |
| 9,222,798 B2* | 12/2015 | Curtis | G01C 21/20 |
| 9,228,851 B2* | 1/2016 | Lobato Fregoso | G01C 21/36 |
| 9,240,124 B2* | 1/2016 | Hiruta | G08G 1/0112 |
| 9,267,806 B2* | 2/2016 | Conner | G01C 21/3407 |
| 9,389,094 B2* | 7/2016 | Brenner | G01C 21/3676 |
| 9,434,389 B2* | 9/2016 | Harsham | B60W 50/0097 |
| 9,476,727 B2* | 10/2016 | Ziezold | G01C 21/3453 |
| 9,518,833 B2* | 12/2016 | Fink | G01C 21/3492 |
| 9,857,185 B2* | 1/2018 | Beaurepaire | G01C 21/3423 |
| 2005/0187707 A1* | 8/2005 | Yokota | G01C 21/3476 |
| | | | 701/410 |
| 2006/0173841 A1* | 8/2006 | Bill | G01C 21/3407 |
| 2007/0150174 A1* | 6/2007 | Seymour | G01C 21/3617 |
| | | | 701/532 |
| 2009/0082953 A1* | 3/2009 | Shimizu | G01C 21/28 |
| | | | 701/466 |
| 2009/0319177 A1* | 12/2009 | Khosravy | G06Q 30/0241 |
| | | | 701/408 |
| 2010/0026526 A1* | 2/2010 | Yokota | G08G 1/096827 |
| | | | 340/996 |
| 2010/0082241 A1 | 4/2010 | Trivedi | |
| 2010/0268460 A1* | 10/2010 | Wan | G01C 21/3415 |
| | | | 701/414 |
| 2011/0004523 A1 | 1/2011 | Giuli et al. | |
| 2011/0106429 A1 | 5/2011 | Poppen et al. | |
| 2012/0019204 A1* | 1/2012 | Matsuo | B60L 3/12 |
| | | | 320/109 |
| 2013/0326425 A1* | 12/2013 | Forstall | G01C 21/3638 |
| | | | 715/851 |
| 2014/0365120 A1 | 12/2014 | Vulcano et al. | |
| 2015/0204688 A1 | 7/2015 | Gearhart et al. | |
| 2015/0285652 A1* | 10/2015 | Peri | G01C 21/3476 |
| | | | 701/438 |
| 2015/0345970 A1* | 12/2015 | Tanaka | G01C 21/3617 |
| | | | 701/521 |
| 2016/0239903 A1* | 8/2016 | Othmer | H04W 4/029 |
| 2017/0115124 A1* | 4/2017 | Mullen | G01C 21/3415 |
| 2017/0192437 A1* | 7/2017 | Bier | G05D 1/0038 |
| 2017/0254660 A1* | 9/2017 | Panahandeh | G01C 21/3484 |

OTHER PUBLICATIONS

Li, J. et al., *Exploring Personalized Travel Route Using POIs*, International Journal of Computer theory and Engineering, vol. 7, No. 2 (Apr. 2015) 126-131.

Extended European Search Report for Application No. EP 17179235.1 dated Sep. 19, 2018, 13 pages.

* cited by examiner

METHOD, APPARATUS AND COMPUTER PROGRAM PRODUCT FOR A NAVIGATION SYSTEM USER INTERFACE

TECHNOLOGICAL FIELD

An example embodiment of the present invention relates generally to providing navigation assistance, and more particularly, to a method, apparatus and computer program product for providing a navigation system user interface with a relevancy ranked listing of milestone locations.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route, or general assistance to a user when no specific destination has been selected. Further, dynamic map attributes such as route traffic, route conditions, and other dynamic map-related information may be provided to enhance the digital maps and facilitate navigation and driver assistance through situational awareness. Typical digital maps and navigation systems may have copious amounts of information available, from various road network awareness to accident, construction, and other traffic-related dynamically updated data. This data is often unused unless a destination has been selected and route guidance to the destination planned.

BRIEF SUMMARY

A method, apparatus, and computer program product are therefore provided for providing a navigation system user interface including a relevance-ranked list of milestone locations. An apparatus may be provided including at least one processor and at least one non-transitory memory including computer program code instructions. The computer program code instructions may be configured to, when executed, cause the apparatus to at least: determine a current, map-matched location and a direction of travel; determine a plurality of milestone locations based on the current, map-matched location and the direction of travel; determine a priority ranking of the plurality of milestone locations; and provide for display of a subset of the plurality of milestone locations having the highest priority. An apparatus of example embodiments may further be caused to: provide for display of an estimated travel time to each of the milestone locations of the subset of the plurality of milestone locations, where the estimated travel time is based on a distance from the current, map-matched location and dynamic traffic awareness.

According to some embodiments, causing the apparatus to determine a plurality of milestone locations based on the current map-matched location and the direction of travel may include causing the apparatus to determine a plurality of milestone locations based on at least two of: a distance to a respective milestone location from the current, map-matched location; a user preference associated with a respective milestone location; a popularity associated with a respective milestone location; one or more characteristics of a respective milestone location; and a user history associated with a respective milestone location. Causing the apparatus of example embodiments to determine a priority ranking for the plurality of milestone locations may include causing the apparatus to: determine a probability for a plurality of road segments along which a user may travel, where the probability of each road segment is indicative of the likelihood that the user will travel along the respective road segment; and determine a priority ranking of the plurality of milestone locations based at least in part on the probability of one of one or more road segments associated with each of the plurality of milestone locations.

Causing the apparatus of some example embodiments to determine a priority ranking for the plurality of milestone locations may include causing the apparatus to: revise the probability for the plurality of road segments along which a user may travel in response to a current, map-matched location changing by a predefined amount; and determine a revised priority ranking of the plurality of milestone locations based at least in part on the probability of one or more road segments associated with each of the plurality of milestone locations in response to the revised probability. Causing the apparatus to determine a priority ranking of the plurality of milestone locations based at least in part on the probability of one or more road segments associated with each of the plurality of milestone locations may include causing the apparatus to determine a priority ranking of the plurality of milestone locations based at least in part on a ratio between an importance factor and a distance to the milestone location from the current map-matched location.

According to some embodiments, causing the apparatus to determine a priority ranking of the plurality of milestone locations may include causing the apparatus to: receive traffic information regarding a route between the current, map-matched location and at least one of the plurality of milestone locations; and determine a new priority ranking of the plurality of milestone locations in response to the traffic information regarding the route between the current, map-matched location and the at least one of the plurality of milestone locations including a traffic anomaly resulting in an estimated travel time increasing above a predetermined value.

Embodiments of the present invention may provide a computer program product including at least one non-transitory computer-readable storage medium having computer-executable program code instructions stored therein, the computer-executable program code instructions including program code instructions to: determine a current, map-matched location and a direction of travel; determine a plurality of milestone locations based on the current, map-matched location and the direction of travel; determine a priority ranking of the plurality of milestone locations; and provide for display of a subset of the plurality of milestone locations having the highest priority. Embodiments may optionally include program code instructions to provide for display of an estimated travel time to each of the milestone locations of the subset of the plurality of milestone locations, where the estimated travel time is based on the distance from the current, map-matched location and dynamic traffic awareness.

The program code instructions to determine a plurality of milestone locations based on the current, map-matched location and the direction of travel may include program code instructions to determine a plurality of milestone locations based on at least two of: a distance to a respective milestone location from the current, map-matched location; a user preference associated with a respective milestone location; a popularity associated with a respective milestone location; one or more characteristics of a respective milestone location; and a user history associated with a respective milestone location. The program code instructions to determine a priority ranking for the plurality of milestone locations may include program code instructions to: determine a probability for a plurality of road segments along which a user may travel, where the probability of each road segment is indicative of the likelihood that the user will travel along the respective road segment; and determine a priority ranking of the plurality of milestone locations based at least in part on the probability one or more road segments associated with each of the plurality of milestone locations.

According to some embodiments, the program code instructions to determine a priority ranking for the plurality of milestone locations may include program code instructions to: revise the probability for the plurality of road segments along which a user may travel in response to a current, map-matched location changing by a predefined amount; and determine a revised priority ranking of the plurality of milestone locations based at least in part on the probability of one or more road segments associated with each of the plurality of milestone locations in response to the revised probability. The program code instructions to determine a priority ranking of the plurality of milestone locations based at least in part on the probability of one or more of the road segments associated with each of the plurality of milestone locations may include program code instructions to determine a priority ranking of the plurality of milestone locations based at least in part on a ratio between an importance factor and a distance to the milestone location from the current map-matched location.

The program code instructions to determine a priority ranking of the plurality of milestone locations may include program code instructions to: receive traffic information regarding a route between the current, map-matched location and at least one of the plurality of milestone locations; and determine a new priority ranking of the plurality of milestone locations in response to the traffic information regarding the route between the current, map-matched location and the at least one of the plurality of milestone locations including a traffic anomaly resulting in an estimated travel time from the current, map-matched location to the respective milestone location increasing above a predetermined value.

Embodiments described herein may provide a method for presenting a list of relevance-ranked milestone locations in a navigation system user interface. Methods may include: determining a current, map-matched location and a direction of travel; determining a plurality of milestone locations based on the current, map-matched location and the direction of travel; determining a priority ranking of the plurality of milestone locations; and providing for display of a subset of the plurality of milestone locations having the highest priority. Methods may optionally include providing for display of an estimated travel time to each of the milestone locations of the subset of the plurality of milestone locations, where the estimated travel time is based on a distance from the current, map-matched location and dynamic traffic awareness.

Determining a plurality of milestone locations based on the current, map-matched location and the direction of travel may include determining a plurality of milestone locations based on at least two of: a distance to a respective milestone location from the current, map-matched location; a user preference associated with a respective milestone location; a popularity associated with a respective milestone location; one or more characteristics of a respective milestone location; and a user history associated with a respective milestone location. Determining a priority ranking for the plurality of milestone locations may include: determining a probability for a plurality of road segments along which a user may travel, where the probability of each road segment is indicative of the likelihood that the user will travel along the respective road segment; and determining a priority ranking of the plurality of milestone locations based at least in part on the probability of one or more road segments associated with each of the plurality of milestone locations.

According to some embodiments, determining a priority ranking for the plurality of milestone locations may include: revising the probability for the plurality of road segments along which a user may travel in response to a current, map-matched location changing by a predetermined amount; and determining a revised priority ranking of the plurality of milestone locations based at least in part on the probability of one or more road segments associated with each of the plurality of milestone locations in response to the revised probability. Determining a priority ranking of the plurality of milestone locations based at least in part on the probability of one or more road segments associated with each of the plurality of milestone locations may further include determining a priority ranking of the plurality of milestone locations based at least in part on a ratio between an importance factor and a distance to the milestone location from the current, map-matched location.

BRIEF DESCRIPTION OF THE DRAWINGS

Figure 1:
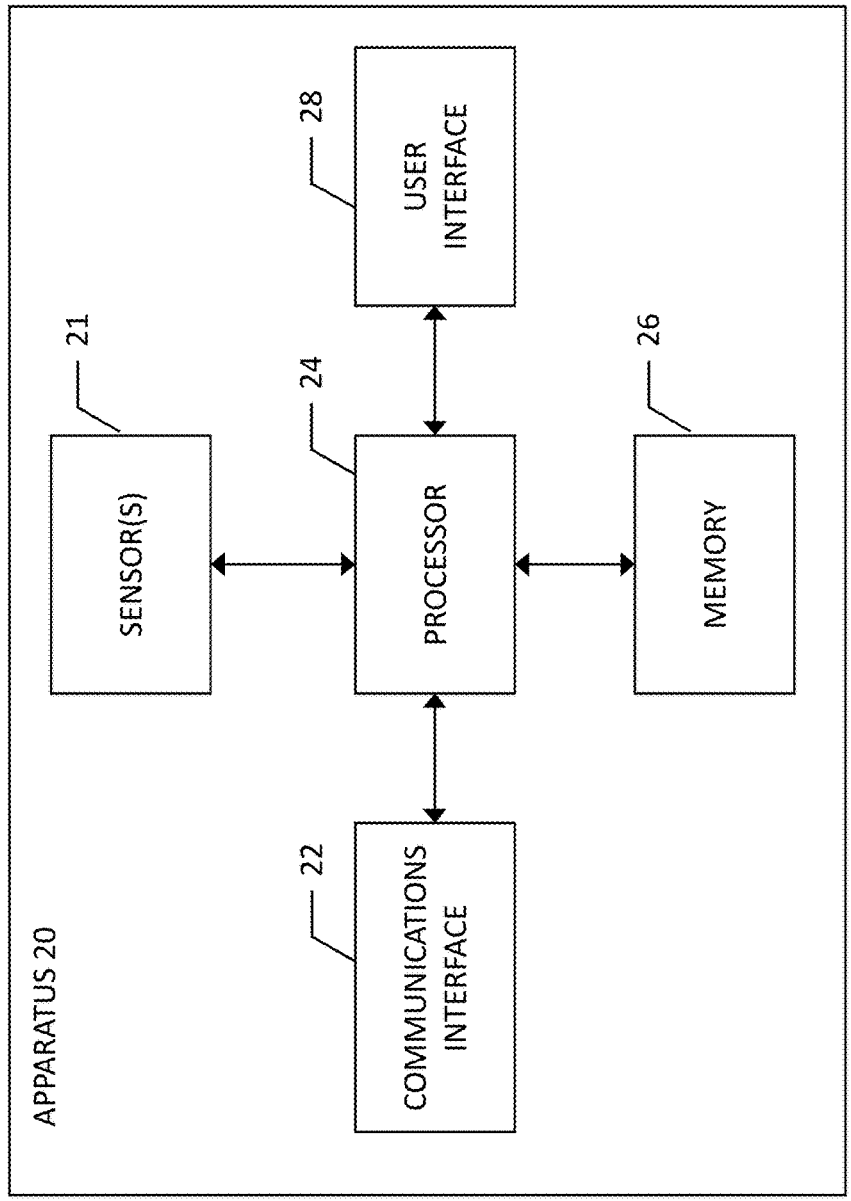
Figure 2:
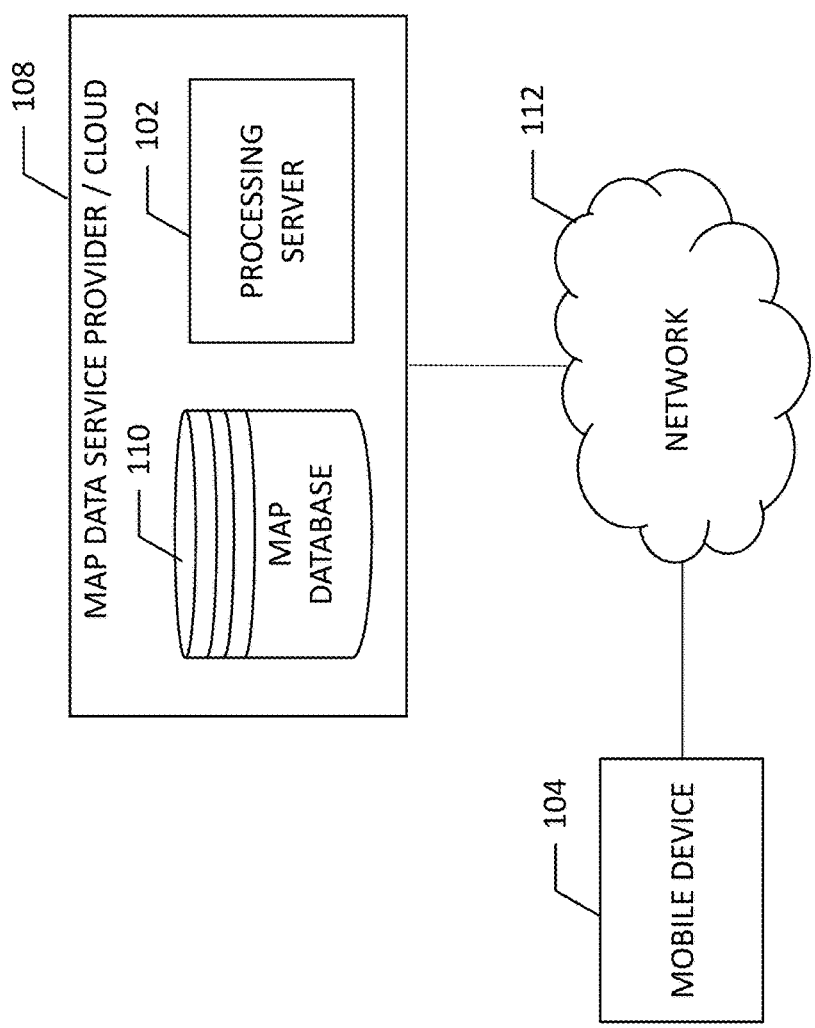
Figure 3:
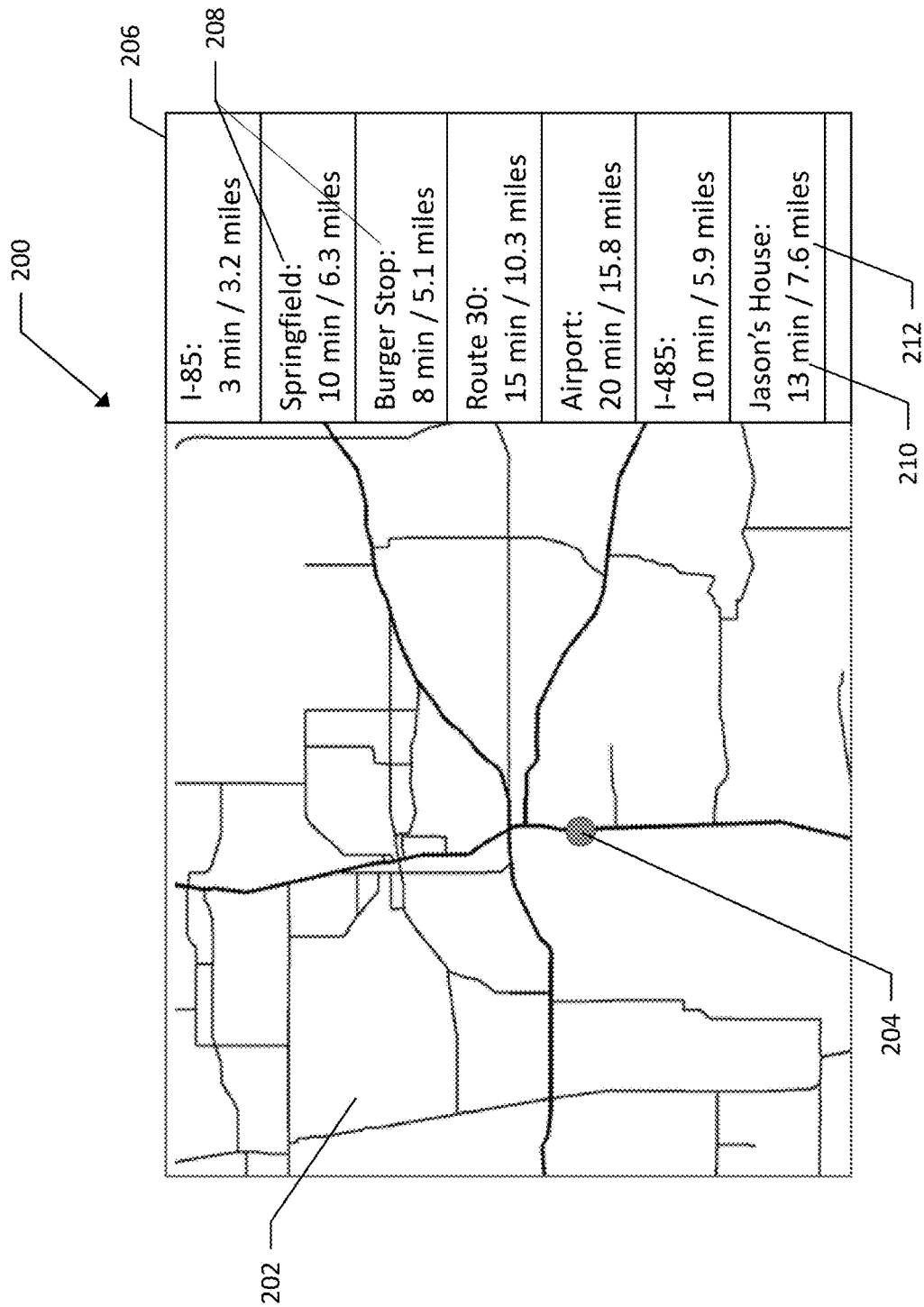
Figure 4:
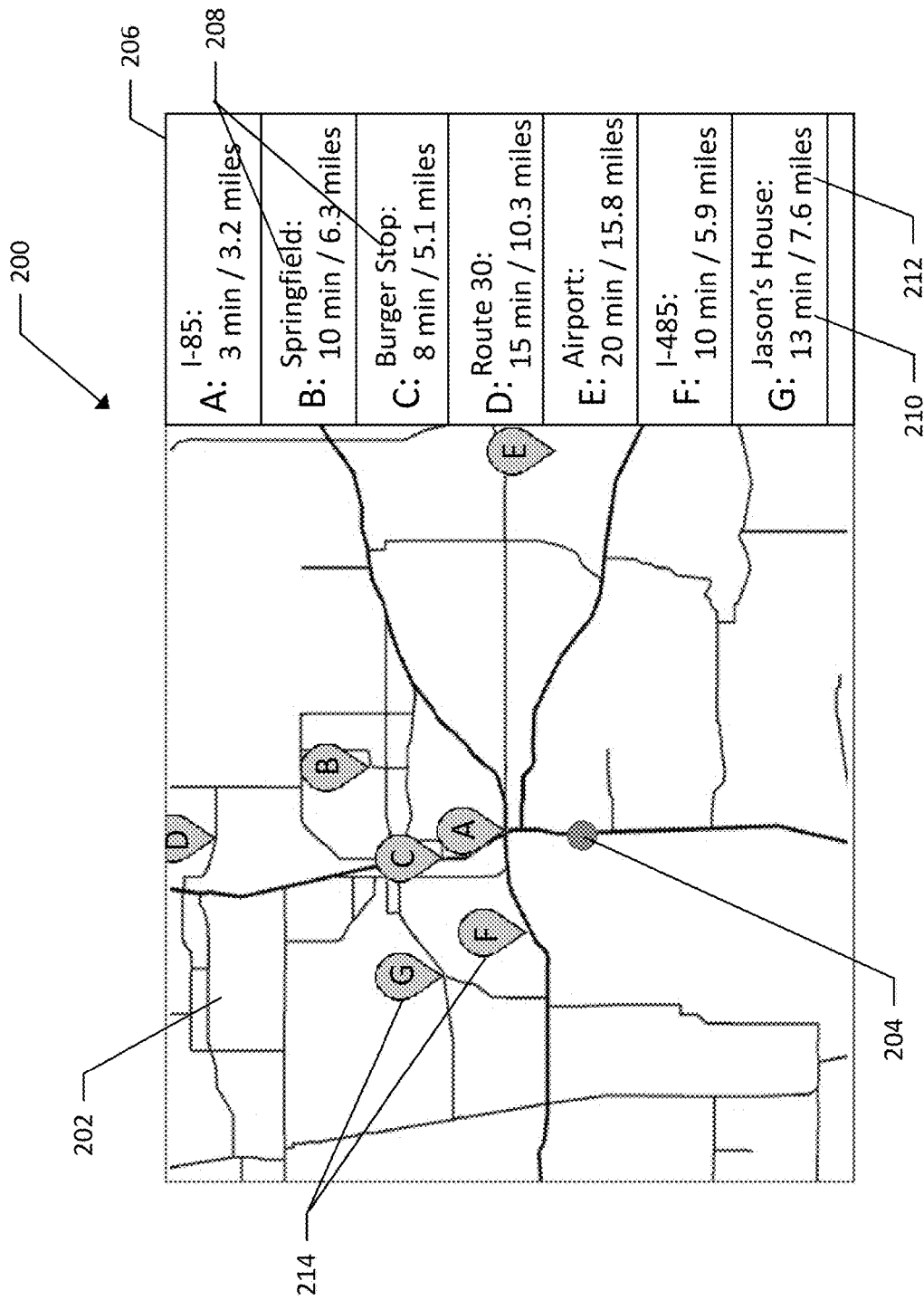
Figure 5:
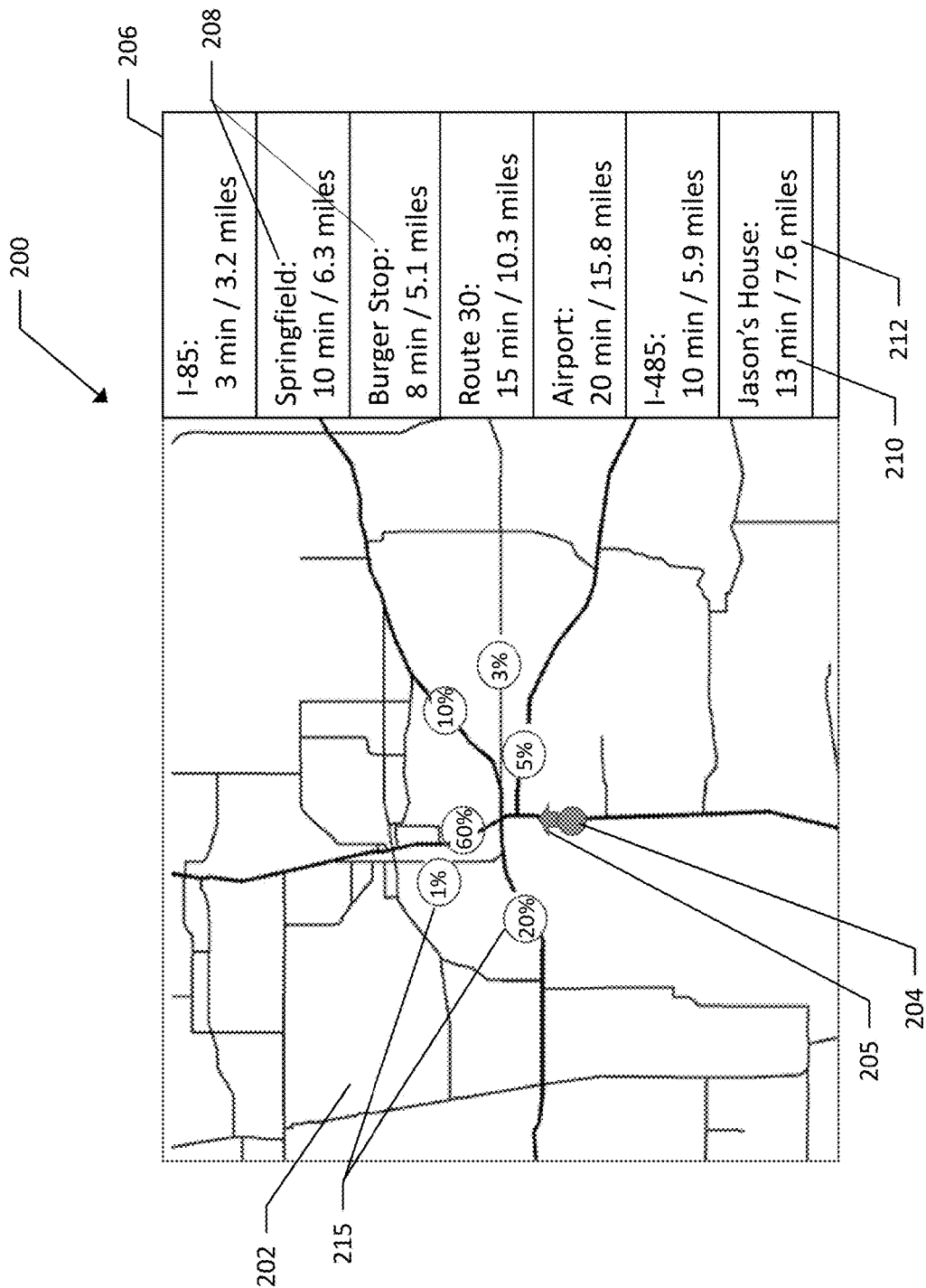
Figure 6:
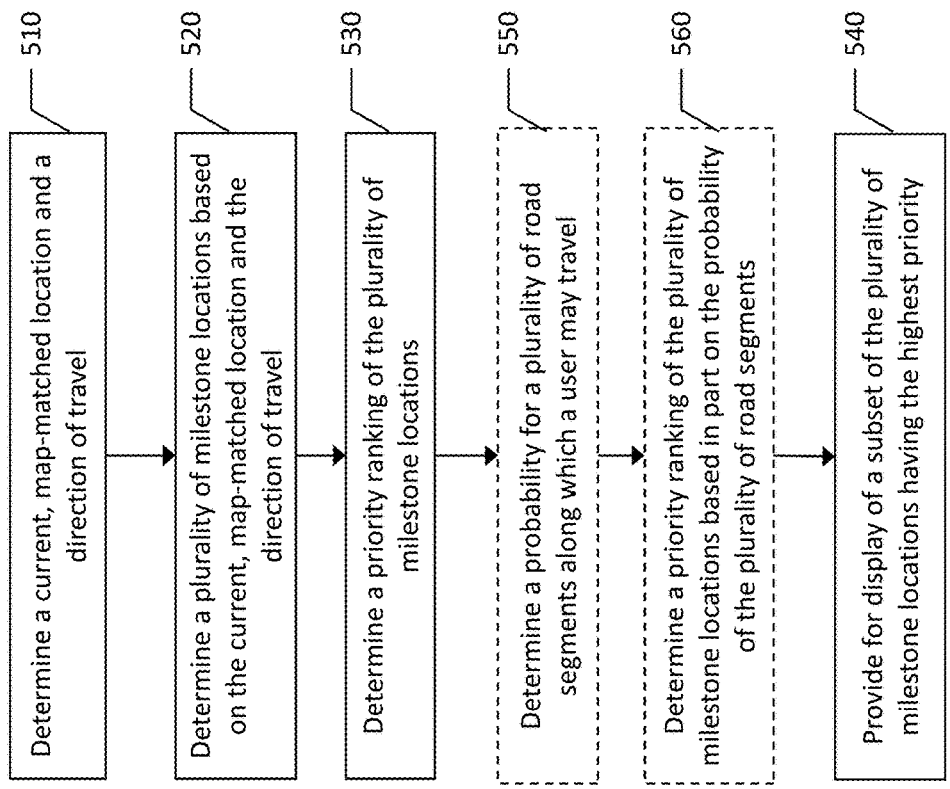

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system for driver assistance on a navigation system according to an example embodiment of the present invention;

FIG. 3 is an example user interface for a navigation system including a relevancy ranked list of milestone locations according to an example embodiment of the present invention;

FIG. 4 is another example user interface for a navigation system including a relevancy ranked list of milestone locations according to an example embodiment of the present invention;

FIG. 5 is still another example user interface for a navigation system including a relevancy ranked list of milestone locations according to an example embodiment of the present invention; and FIG. 6 is a flowchart of a method for determining a relevancy ranked list of milestone locations and presenting them in a navigation system user interface according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing a navigation system user interface to provide driver assistance in an instance in which no destination has been selected in the navigation system and driver assistance is provided. In this regard, a user interface of a device, such a mobile device or a device affixed to a vehicle, such as to a dashboard or the like, may provide driver assistance to a user. A display reflecting a current position along a roadway, traffic information, a list of milestone locations, and estimated time and/or travel distance to one or more of the milestone locations.

As described herein, embodiments of the claims provide for a user interface with a navigation system. While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. Conversely, as described herein, a navigation system may be used in the absence of a discrete destination to provide driver assistance and information. Example embodiments described herein provide a navigation system user interface where a portion of the user interface is used to present a list of relevant milestone locations or waypoints that the user may recognize by name, and the respective traffic-aware estimated travel time (ETT) to those locations. Embodiments described herein provide for selection of these milestone locations and sort the milestone locations by virtue of analysis of the locations as described further below.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a navigation system user interface may be provided to provide driver assistance to a user traveling along a network of roadways. Navigation systems may receive an indication of a current location of the user, and one or more milestone locations that are selected based on one or more of user history, milestone type, user preferences, etc. Each of the one or more milestone locations may include a traffic-aware estimated travel time to arrive at the respective milestone location. The milestone locations may be presented to a user and sorted according to user preferences, proximity, milestone type, or any combination thereof. The milestone locations may or may not be relevant to a user's planned route, if there is a planned route, but may be informative to a user for selecting a route to take or to avoid, for example.

A map service provider database may be used to provide driver assistance via a navigation system. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, or the like, and a map data service provider or cloud service 108. Each of the mobile device 104 and map data service provider 108 may be in communication with at least one of the other elements illustrated in FIG.

2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Example embodiments provided herein provide a method of presenting useful information to a driver through a navigation system when a distinct destination is not established at the navigation system. For example, a user may be driving home from work, a drive that they perform routinely, such that route guidance assistance may not be needed. However, information regarding traffic, milestone locations (e.g., points of interest, intersections, etc.) and their associated estimated travel times may be informative to the user as they self-navigate their route home.

According to the illustrated embodiment of FIG. 3, a user interface may be provided for display on display 200. The user interface may include a depiction of a map 202 of a region or portion thereof. The map 202 may include an indication 204 of a current location on the map or a "map-matched" location where the determined position of the user is correlated or "matched" with known routes or roads on a map. The map may scroll to maintain the indication of the current location proximate the center of the displayed map region. The illustrated embodiment further includes a listing of milestone locations 206 disposed on the right side of the display 200. While this listing is illustrated along an edge of the display, embodiments may include a list that is presented along any other edge, such as the bottom, top, or right, or disposed away from an edge, while not detracting from other information that may be provided for display, such as the map 202. While the illustrated embodiment depicts a map 202 displayed adjacent to the list of milestone locations, other information may similarly be presented, such as a street-view image, traffic event notice, or other information. Further, in example embodiments in which the display 200 is part of an in-vehicle entertainment system or a multi-functional user interface (e.g., for music, phone interaction, vehicle information, etc.), the map 202 may be replaced, overlaid, or supplemented with other displayed information.

As shown, the list of milestone locations 206 includes a list of various types of locations 208 along with estimated travel times 212 and distances 210. The distances may be a distance from the current location (e.g., point 204 on the map 202), and the estimated travel time may be traffic-aware such that traffic density and speed considerations are taken when estimating the travel time. The locations of the milestones are identified by name such that a driver or user may easily identify the milestones. For example, as shown in FIG. 3, Interstate 85 (I-85) is 3.2 miles (or 5 kilometers) away, and can be reached in approximately 3 minutes. While Interstate 85 is not a distinct location, the milestone location indicated at "I-85" indicates an intersection with Interstate 85, which may be with the same road currently traveled by a user, or by a connector road onto which a user must turn before encountering the Interstate 85 interchange. Optionally, an intersection can be identified by the names of both roadways that form the intersection to remove any perceived ambiguity.

Milestone locations may include a number of different types of locations. For example, milestone locations may include cities or towns, highway exits/interchanges, roadway intersections, points-of-interest, or the like. Optionally, milestone locations may be personalized to include milestones inferred from the user's personal road network (e.g., roads traveled regularly or frequently by the user), from the user's contacts in an address book, a user's preferences (e.g., a particular restaurant if a user has expressed an interest in or regularly visited such a restaurant), a user's workplace, etc.

FIG. 4 illustrates an example embodiment of a displayed map 202 including markers 214 for each milestone location. In this manner, the milestone locations listed in list 206 are correlated with locations on the map 202. As shown, it is not a requirement that each of the milestone locations appear along a single route, and may appear in destinations which require divergent routes, such as the "E: Airport" and "F: I-485". The markers 214 depicted in FIG. 4 may or may not be presented on the display, and these markers may in some embodiments replace the list of milestone locations 206 by providing information regarding the milestone location in the map marker itself. However, this may render a display too cluttered, particularly when there are a plurality of closely grouped milestone locations, or when the display is relatively small.

One aspect of the present invention includes the selection of milestone locations. As there can be dozens, or even hundreds or thousands of potential milestone locations, embodiments described herein provide a method of selecting the milestone locations to be displayed. Further, the arrangement of milestone locations presented on the display may be determined by example embodiments described herein. For example, the closest milestone location may not be the milestone location presented at the top of the list 206.

The selection of milestone locations may be determined, at least in part, by the type of milestone location. While a plurality of categories of milestone locations may be used, three basic categories will be described herein. Those types of milestone locations may include cities/towns, highway exits/interchanges, and personal milestone locations.

City/town miles tone locations may be determined based on a qualifying threshold. For each city or town whose importance is above the threshold may qualify as a milestone location. Importance may be established based on a size of the city or town (e.g., by population), or a frequency with which a user visits the town or city (e.g., regular visits may equate to higher importance). A set of points for each such milestone may be generated. For each highway exit whose name contains the name of the city or town, the point on the highway located immediately before the exit may be added, for example. If the exit exists in both directions (e.g., Exit 4A and Exit 4B, with one heading east and one heading west), a point for each direction may be created. For each main road crossing in the city's boundary, the point of the crossing may be added. Each of these may be classified as a city or town milestone location. Alternatively, a city center may be used as the milestone location for a city or town.

Highway exits may be a milestone location, with the location identified by the name of the exit or by the roadway joined by the exit. The corresponding milestone location may be located after the exit (e.g., not on the highway), or for highway interchanges, the milestone location may be located at the beginning of the respective exit ramp.

Personal milestone locations may be based on a set of "personal routes" as recorded by the navigation system. For each set of two or more routes traveled that includes one or more road segments in common (in the same travel direction), the beginning and/or ends of the common portion of roadway may be extracted as a personal milestone. For example, if three previously traveled routes to three different destinations each include a common route portion (e.g., the roads from a person's house to three different destinations within a particular city), the point at which one or more of those routes diverges from the common route portion may be a personal milestone location. Similarly, if a set of routes includes a common destination, where the set of routes converge at one or more points before becoming a common route, the point of convergence of two or more of the routes may become a personal milestone location. To become a personal milestone location, additional conditions may optionally be required to be met, such as the number of times the road segment has been driven may need to meet a predetermined value, and/or the relative difference of the number of times each road has been driven is below a predetermined value but above a second predetermined value, a nearest intersection may be established as the milestone location.

Additional milestone locations may be established based on a frequency of visit, such as a workplace which is visited daily or several times weekly, a store that is visited weekly, or bi-weekly, the home of a friend that is visited periodically, a general point-of-interest (e.g., a park or museum), or a location that meets a user's predetermined criteria regarding locations of interest, such as certain types of restaurant cuisine or a certain financial institution chain (e.g., a branch of the user's bank).

The selection of milestone locations may be performed according to a threshold or predetermined criteria that the milestone locations must meet; however, even after selection of the milestone locations, the priority or ranking of the milestone locations may be determined to ensure that the most relevant milestone locations appear in the listing 206 on the display 200.

In order to rank the milestone locations, a probability of traversing, passing through, or arriving at each milestone location may be calculated to be factored in to the ranking of the milestone locations. The milestone locations may be considered as potential waypoints or as potential destinations. Methods of calculating the probability may enable a combination of personal and global (e.g., crowd-sourced) behavioral data to obtain an accurate probability distribution over all potential milestone locations.

According to some embodiments, for each milestone location, the probability of the user traversing associated road segments to reach the milestone location may calculated and sorted according to highest probability first. Each milestone location may be associated with one or more road segments that provide access to the milestone location. In a simple example, two milestone locations may include a highway interchange that is traveled on weekdays by a user at a particular time (e.g., on the way to a place of work), while a second milestone location may include a secondary road intersection that has been traveled several times over the course of the previous month. Provided the context of the user includes that the time and day of the week corresponds to the user being on the way to a place of work, the highway interchange may be prioritized over the secondary road intersection in the list of milestone locations.

Given a set of milestone locations that are established based on thresholds or predetermined criteria, in order to rank the milestone locations, the relevancy of the milestone locations is to be determined with the most relevant milestone locations ranked highest. In an instance in which a route is known, such as in a route-guidance scenario of a navigation system, the selection of the most relevant milestone locations is substantially a trivial task since the next milestone location on the route may be selected as the most relevant milestone location. However, embodiments of the present invention generate a set of milestone locations and rank those milestone locations according to relevancy without a pre-defined route, making the selection and ranking considerably more challenging.

The relevance of a milestone location may be established based on a likelihood of a user/vehicle traversing a road segment corresponding to the milestone location. The most likely road links ahead of a user/vehicle may be predicted in the absence of a predefined route. A higher likelihood of a user traversing a road segment corresponding to a milestone location may correspond to a higher relevancy ranking of that milestone location. Based on a current location and a current direction of travel of a user, at each upcoming intersection along each potential path, the road exiting the intersection with the highest probability contributes to a determination of the likelihood of a user traversing an associated road segment. For example, if a user is entering an intersection along a minor road (e.g., a rural route or low-traffic road) in a northerly direction, and the minor road continues north from the intersection, while a major road crosses east to west at the intersection, the higher likelihood of travel may be to exit the intersection along the major road as it is more heavily traveled. Further, the direction taken at the intersection may be influenced by the next most likely milestone location, such as a location that is frequented by a user. The milestone locations along a road segments with higher probabilities may be given a higher relevance rating, while milestone locations along road segments with lower probabilities may be given a lower relevance rating.

The probability that a road segment may be traversed may be established based on turn prediction, which is the prediction of the most likely path exiting an intersection. Geometric aspects of the intersection may be considered, such as a straighter route exiting an intersection may be more likely than a turn, or a road with a lower road class may be deemed less likely to be taken. A success metric may be generated measuring the success rate of predicted turns for all intersections traversed by a user. For all intersections, an electronic-horizon-engine may be used to establish the route exiting the intersection that has the highest probability of being taken by the user. If an intersection decision is properly predicted, the success metric is increased. The success metric may be established by a number of successfully predicted intersection decisions divided by the number of intersections traversed by the user.

Given a set of turn probabilities at an intersection, these probabilities are recursively propagated into the road network, such that each segment of road or road segment has an associated probability that the user may traverse that particular section of road. The probability may decrease proportionally to the number of turns needed to reach a particular road segment. Thus, in a network of roads that are proximate or within a predefined distance of the current location of a user, each road segment has a probability that the user will actually traverse that section of road. The recursive propagation of turn probabilities may be stopped in response to a threshold criteria such as a minimum probability that a user will traverse a particular road segment or a maximum number of turns required to get to a particular road segment. If a road segment can be reached by multiple paths, the probabilities may be summed to reach a cumulative probability, or alternatively, the maximum probability from among the different routes may be selected as the probability for that particular road segment.

Probabilities or the likelihood that a user is going to traverse a particular road segment may depend, at least in part, on the number of maneuvers between the road segment and the current location. This means that road segments far ahead of the user may not be afforded a substantial probability or likelihood, despite a user on a trajectory that may correspond with a road segment that is far ahead of the user. According to some embodiments described herein, some road segments may receive a weight factor or "boost" in order to increase the probability of distal road segments based on a trajectory or most probable path. For example, a most probable road segment exiting an intersection may be afforded a higher weight than simply a weight corresponding to its probability, thereby increasing the probability of road segments that follow a most likely route of the user. This boosting or weighting may result in higher probabilities increasing, while lower probabilities decrease, resulting in road segments that are far away being afforded a higher probability if it is anticipated that they are along a most probable route for a user.

The probability associated with a road segment may be influenced by various factors that contribute to the probability score or likelihood that a user will traverse the road segment. Factors may include: depth—the number of maneuvers required to reach the road segment, where more maneuvers equates to a lower probability; road class—where higher classes of roads are deemed more likely to be traversed; direction—road segments disposed at a compass direction further off of the heading of the user may be less likely to be traversed; and efficiency—if a road segment is a faster route with less traffic congestion it may be more likely to be traversed.

A milestone location is associated with one or more road segments that pass by, terminate, or otherwise provide access to the milestone location. The probability associated with the one or more road segments associated with the milestone location may contribute to the ranking of the milestone location. FIG. 5 illustrates an example embodiment in which a likelihood of a user traversing particular road segments is illustrated. As shown, if the user is at a current map-matched location 204 heading in a direction indicated by arrow 205, the most probable route may be to continue on the same road, straight, as indicated by the "60%" indicator. While the probabilities 215 are depicted in the example embodiment of FIG. 5, these probabilities may not be displayed on a user interface, as the probabilities are used in the background to help establish the ranking of the milestone locations shown in 206. As shown, the likelihood of the user traversing the road segments heading toward the airport (E of FIG. 4), are 3% and 5%, such that it is unlikely that the user is heading toward the airport, and the airport is accordingly ranked lower among the milestone locations. Conversely, a milestone location disposed along a road segment with a higher associated probability may be afforded a higher relevancy ranking and ranked higher in the list 206.

While the likelihood or probability of a user traversing a road segment proximate or associated with a milestone location may be used to influence the ranking the relevancy of a milestone location, other factors may be considered in the ranking. For example, a milestone location type may be considered, or certain characteristics of the location may be considered. For example, in an instance in which a user is equidistant between two cities, and the direction of travel is toward both cities, the size of the city may be considered in establishing which milestone location has a higher relevancy rating. Beyond size, a popularity of a milestone location may also be considered in the relevancy rating of a milestone location. For example, a park with crowd-sourced data (e.g., probe data from vehicles) indicating a rate of 1,000 visits per day may be prioritized over a park with crowd-sourced data indicating a rate of 100 visits per day. Further, while the more popular park may be a greater distance away from the user, it may be prioritized over the less popular park due to the drastic difference in popularity.

User preferences may also contribute to a ranking of the relevance of milestone locations. For example, a user may provide preferences in a settings menu regarding the types of locations they prefer (e.g., types of restaurant cuisine, outdoor activities, highways preferred over lower classes of roads, etc.) These preferences may be considered in the ranking of milestone location and influence the position of milestone locations on the list 206. Beyond user-defined preferences, data gathered regarding historical routes, destinations, and interests may be used to influence the ranking of milestone locations. A user may have a history of taking small rural routes on long trips. This history may be established based on probe data gathered over a period of time. Using this data, a milestone location of a town along the rural route may be given a higher ranking than a larger city disposed along an interstate in a similar direction of travel.

In addition to the likelihood associated with road segments, user preferences, user history, and milestone location popularity, the distance to a milestone location may influence the relevance ranking. For example, a gas station that is five miles away may be given precedence over a gas station that is seven miles away. However, if the price of gas at these two stations are known, this information may influence the relevance ranking of them in list 206. A minor price difference may not be substantial enough to move the gas station that is further away ahead of the gas station that is closer on the relevancy ranked list, but a substantial price discrepancy may cause the gas station that is further from the user to be moved to a higher relevance ranking.

Milestone locations may also be afforded an importance/distance ratio, whereby the importance of a milestone location may be considered against a distance to that milestone location. The importance may be established based on user preferences, user history, and/or popularity of a milestone location, for example. A milestone location that has a low importance but a high distance from the current, map-matched location will have a low importance/distance ratio, and thus would be ranked with a relatively low relevance. Conversely, a milestone location that is both important and proximate would have a relatively high relevance ranking. A milestone location that is both important and far away may overcome the distance dilemma by being important to the user, such that the milestone location may still be ranked highly by relevance. Importance may also be a factor or characteristic of a milestone location. For example, a big city may have a high importance. An importance/distance ratio for a big city that is 60 miles away (~100 km) may still have a relatively high relevance ranking, while a small town that is 6 miles away (—10 km) may have a relatively low relevance ranking.

As described above, a plurality of factors can be used to influence the list of milestone locations presented in list 206 on display 200. The factors can include one or more of the most probable path, the current distance to the milestone location, the popularity of the milestone location (based on crowd-sourced data, for example), characteristics of the milestone location, user preferences, and user historical behavior. The influence of each factor used in determining the relevancy ranking may be combined to form a combined score by which each milestone location is ranked against the other milestone locations. In this manner, the most relevant milestone locations may be presented in list 206.

The number of milestone locations presented in the list 206 may be determined based on user preferences where a user may be able to set a list to include 5, 10, or 15 milestone locations, for example. Optionally, the number of milestone locations may be dynamic and change based upon factors or thresholds, such as presenting only milestone locations that are within a predefined distance of the user, or within a predefined travel time of the user.

The relevancy ranking of each milestone location may also be dynamic and may change periodically. The re-ranking of the milestone locations may be performed on a routine, periodic basis, such as every 30 seconds, or the re-ranking may be performed based on a distance traveled (e.g., ½ mile or 1 kilometer). Re-ranking may be performed in response to a turn by a user/vehicle onto a different road segment. Optionally, the re-ranking period may also be dynamic, such as changing based on the speed of travel of a user, where at a higher speed, re-ranking may be performed at a higher rate. Optionally, re-ranking may be performed at a rate established based on the distance or estimated travel time to the most relevant milestone location. For example, in an instance in which the highest ranked milestone location is 30 minutes away, re-ranking may be performed less often. Optionally, when the number of milestone locations are low, such as in a rural area, the milestone location re-ranking may be conducted at a lower rate than in a densely populated area with a greater number of milestone locations.

The relevancy ranking of each milestone location may optionally be influenced by dynamic traffic patterns and an understanding of typical traffic patterns. For example, a milestone location relevancy ranking may remain unchanged if traffic between the current, map-matched location and the milestone location is relatively light or consistent with anticipated traffic patterns. A milestone location may be reconsidered or re-ranked if the traffic between the current location and the milestone location is considerably heavier than anticipated. The degree of traffic congestion may be determined based on an estimated time to traverse a segment of road relative to the estimated time to traverse the segment of road under normal conditions (e.g., light or no traffic). Optionally, a particular stretch of road may be known for heavy traffic, such as using probe data over a monitored period of time, such that the "normal conditions" for that section of road are established based on the relatively heavy traffic, at least for a particular time frame and day or days of the week.

Milestone locations may also be considered based on their proximity to one another as to whether they should be included in a milestone location ranking. If two or more milestones are within a quarter-mile or 500 meters of one another, only the milestone location with the highest relevancy ranking may be kept.

FIG. 6 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method for providing a navigation user interface including a relevance-ranked list of milestone locations. As shown at 510, a current, map-matched location and a direction of travel may be determined. The location may be established, for example, using sensor 21 of apparatus 20, which may include a global positioning system sensor. The direction of travel may be determined based on the determination of sequential positions. Map-matching of the location may be performed, for example, using map data from a map database either from a service provider 108 or at the apparatus using stored map data in memory 26. Map-matching may include determining a road segment corresponding to the current location of the apparatus 20. A plurality of milestone locations may be determined based on the current, map-matched location and the direction of travel as shown at 520 of FIG. 6. These milestone locations may be ranked by priority at 530, and a subset of the priority ranked milestone locations may be provided for display at 540.

Optionally, the determination of the priority may be performed according to optional elements 550 and 560 of FIG. 6, where a probability is determined for a plurality of road segments along which a user may travel at 550. Based on that probability, the priority ranking of the milestone locations may be based, at least in part, on a probability of a user traversing a road segment that corresponds to the milestone location as shown at 560.

In an example embodiment, an apparatus for performing the method of FIG. 6 above may comprise a processor (e.g., the processor 24) configured to perform some or each of the operations (510-560) described above. The processor may, for example, be configured to perform the operations (510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
determine a current, map-matched location and a direction of travel;
determine a plurality of milestone locations based on the current, map-matched location and the direction of travel;
determine a priority ranking of the plurality of milestone locations by causing the apparatus to:
determine a probability for a plurality of road segments along which a user may travel, wherein the probability of each road segment is indicative of a likelihood that the user will travel along the respective road segment; and
determine a priority ranking of the plurality of milestone locations based at least in part on the probability of one or more road segments associated with each of the plurality of milestone locations and based at least in part on an importance factor associated with the milestone locations and a distance to the milestone locations from the current map-matched location; and
provide for display of a subset of the plurality of milestone locations based on the priority of the milestone locations.

2. The apparatus of claim 1, wherein the apparatus is further caused to:
provide for display of an estimated travel time to each of the milestone locations of the subset of the plurality of milestone locations, wherein the estimated travel time is based on distance from the current, map-matched location and dynamic traffic awareness.

3. The apparatus of claim 1, wherein causing the apparatus to determine a plurality of milestone locations based on the current, map-matched location and the direction of travel comprises causing the apparatus to:
determine a plurality of milestone locations based on at least two of:
a distance to a respective milestone location from the current, map-matched location;
a user preference associated with a respective milestone location;
a popularity associated with a respective milestone location;
one or more characteristics of a respective milestone location; and
a user history associated with a respective milestone location.

4. The apparatus of claim 1, wherein causing the apparatus to determine a priority ranking for the plurality of milestone locations comprises causing the apparatus to:
revise the probability for the plurality of road segments along which a user may travel in response to a current, map-matched location changing by a predefined amount; and
determine a revised priority ranking of the plurality of milestone locations based at least in part on the probability of one or more road segments associated with each of the plurality of milestone locations in response to the revised probability.

5. The apparatus of claim 1, wherein causing the apparatus to determine a priority ranking of the plurality of milestone locations based at least in part on the importance factor associated with the milestone locations and the distance to the milestone locations from the current map-matched location is based at least in part on a ratio between the importance factor associated with a milestone location and the distance to the respective milestone location from the current map-matched location.

6. The apparatus of claim 1, wherein causing the apparatus to determine a priority ranking of the plurality of milestone locations comprises causing the apparatus to:
receive traffic information regarding a route between the current, map-matched location and at least one of the plurality of milestone locations; and
determine a new priority ranking of the plurality of milestone locations in response to the traffic information regarding the route between the current, map-matched location and the at least one of the plurality of milestone locations including a traffic anomaly resulting in an estimated travel time increasing above a predetermined value.

7. A computer program product comprising at least one non-transitory computer-readable storage medium having computer-executable program code instructions stored therein, the computer-executable program code instructions comprising program code instructions to:
determine a current, map-matched location and a direction of travel;
determine a plurality of milestone locations based on the current, map-matched location and the direction of travel;
determine a priority ranking of the plurality of milestone locations using program code instructions to:
determine a probability for a plurality of road segments along which a user may travel, wherein the probability of each road segment is indicative of a likelihood that the user will travel along the respective road segment; and
determine a priority ranking of the plurality of milestone locations based at least in part on the probability of one or more road segments associated with each of the plurality of milestone locations and based at least in part on an importance factor associated with the milestone locations and a distance to the milestone locations from the current map-matched location; and provide for display of a subset of the plurality of milestone locations based on the priority of the milestone locations.

8. The computer program product of claim 7, further comprising program code instruction to:
provide for display of an estimated travel time to each of the milestone locations of the subset of the plurality of milestone locations, wherein the estimated travel time is based on distance from the current, map-matched location and dynamic traffic awareness.

9. The computer program product of claim 7, wherein the program code instructions to determine a plurality of milestone locations based on the current, map-matched location and the direction of travel comprises program code instructions to:
determine a plurality of milestone locations based on at least two of:
a distance to a respective milestone location from the current, map-matched location;
a user preference associated with a respective milestone location;
a popularity associated with a respective milestone location;
one or more characteristics of a respective milestone location; and
a user history associated with a respective milestone location.

10. The computer program product of claim 7, wherein the program code instructions to determine a priority ranking for the plurality of milestone locations comprises program code instructions to:
revise the probability for the plurality of road segments along which a user may travel in response to a current, map-matched location changing by a predefined amount; and
determine a revised priority ranking of the plurality of milestone locations based at least in part on the probability of one or more road segments associated with each of the plurality of milestone locations in response to the revised probability.

11. The computer program product of claim 7, wherein the program code instructions to determine a priority ranking of the plurality of milestone locations based at least in part on the importance factor associated with the milestone locations and the distance to the milestone locations from the current map-matched location is based at least in part on a ratio between the importance factor associated with a milestone location and the distance to the respective milestone location from the current map-matched location.

12. The computer program product of claim 7, wherein the program code instructions to determine a priority ranking of the plurality of milestone locations comprises program code instructions to:
receive traffic information regarding a route between the current, map-matched location and at least one of the plurality of milestone locations; and
determine a new priority ranking of the plurality of milestone locations in response to the traffic information regarding the route between the current, map-matched location and the at least one of the plurality of milestone locations including a traffic anomaly resulting in an estimated travel time between the current, map-matched location and the at least one of the plurality of milestone locations increasing above a predetermined value.

13. A method comprising:
determining a current, map-matched location and a direction of travel;
determining a plurality of milestone locations based on the current, map-matched location and the direction of travel;
determining a priority ranking of the plurality of milestone locations by:
determining a probability for a plurality of road segments along which a user may travel, wherein the probability of each road segment is indicative of a likelihood that the user will travel along the respective road segment; and
determining a priority ranking of the plurality of milestone locations based at least in part on the probability of one or more road segments associated with each of the plurality of milestone locations and based at least in part on an importance factor associated with the milestone locations and a distance to the milestone locations from the current map-matched location; and
providing for display of a subset of the plurality of milestone locations based on the priority of the milestone locations.

14. The method of claim 13, further comprising:
providing for display of an estimated travel time to each of the milestone locations of the subset of the plurality of milestone locations, wherein the estimated travel time is based on distance from the current, map-matched location and dynamic traffic awareness.

15. The method of claim 13, determining a plurality of milestone locations based on the current, map-matched location and the direction of travel comprises:
determining a plurality of milestone locations based on at least two of:
a distance to a respective milestone location from the current, map-matched location;
a user preference associated with a respective milestone location;
a popularity associated with a respective milestone location;
one or more characteristics of a respective milestone location; and
a user history associated with a respective milestone location.

16. The method of claim 13, wherein determining a priority ranking for the plurality of milestone locations comprises:
revising the probability for the plurality of road segments along which a user may travel in response to a current, map-matched location changing by a predefined amount; and
determining a revised priority ranking of the plurality of milestone locations based at least in part on the probability of one or more road segments associated with each of the plurality of milestone locations in response to the revised probability.

17. The method of claim 13, wherein determining a priority ranking of the plurality of milestone locations based at least in part on the importance factor associated with the milestone locations and the distance to the milestone locations from the current map-matched location is based at least in part on a ratio between the importance factor associated with a milestone location and the distance to the respective milestone location from the current map-matched location.

* * * * *